A. H. BARR.
SIGNALING DEVICE.
APPLICATION FILED JAN. 3, 1920.
1,356,185.  Patented Oct. 19, 1920.
4 SHEETS—SHEET 1.
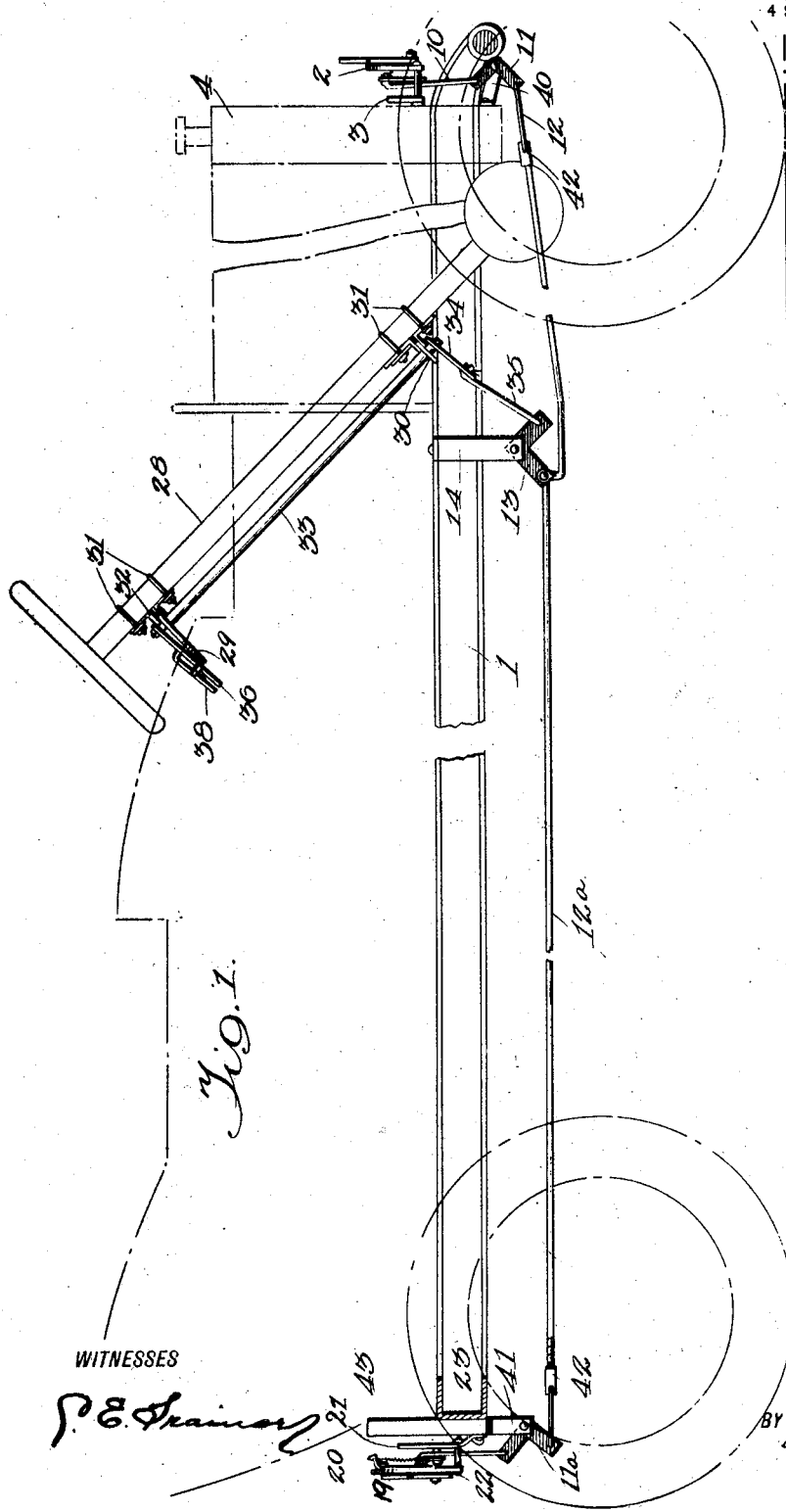
WITNESSES
INVENTOR
A. H. BARR
BY
ATTORNEYS A. H. BARR.
SIGNALING DEVICE.
APPLICATION FILED JAN. 3, 1920.
1,356,185.
Patented Oct. 19, 1920.
4 SHEETS—SHEET 2.
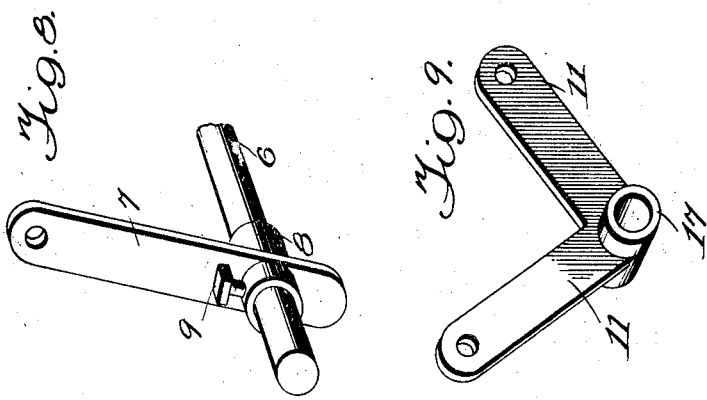
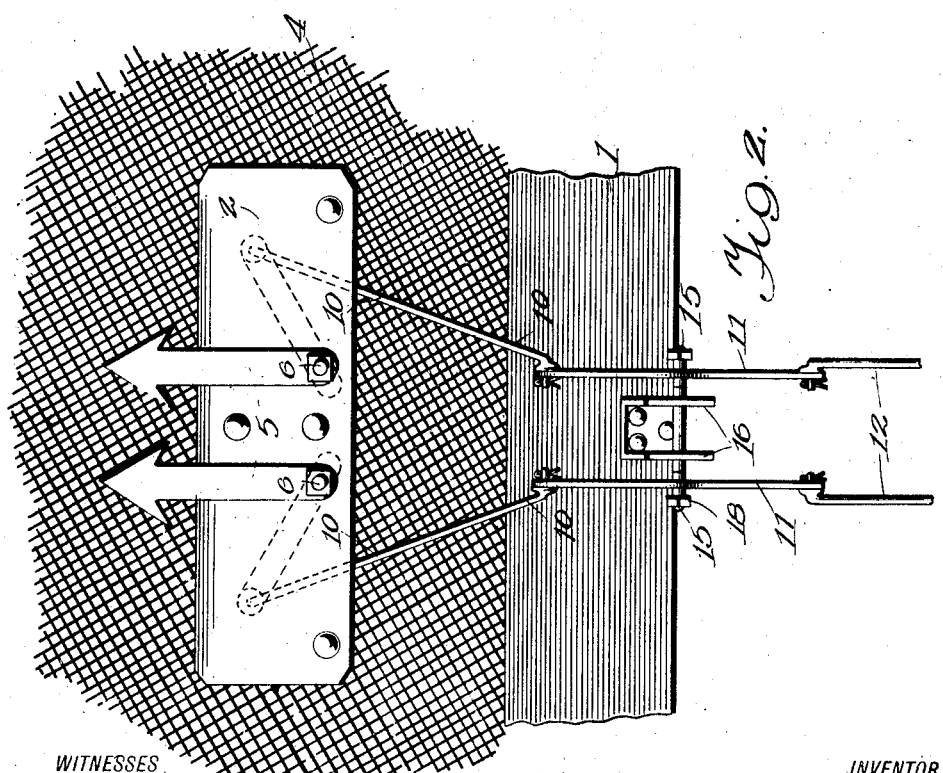

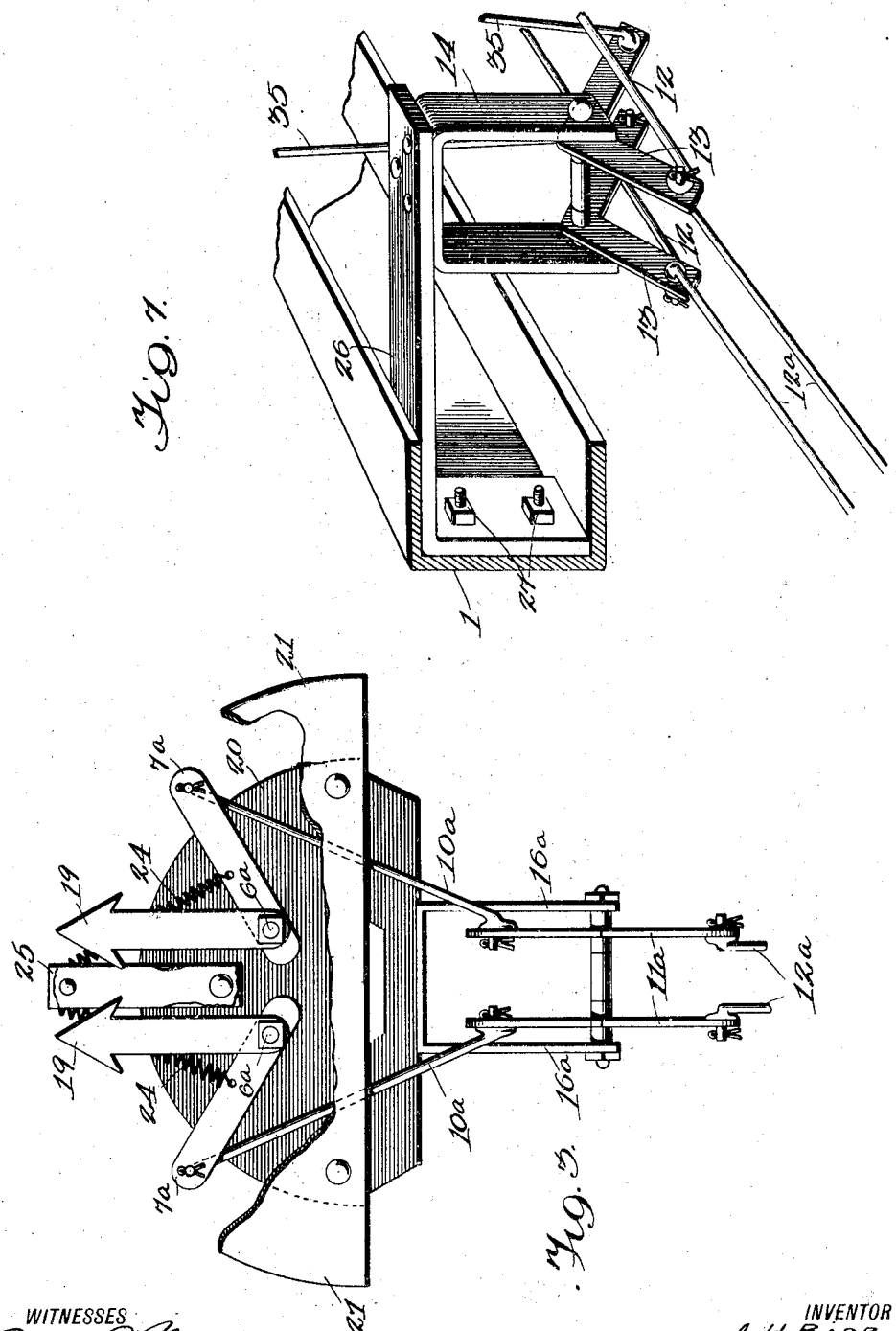

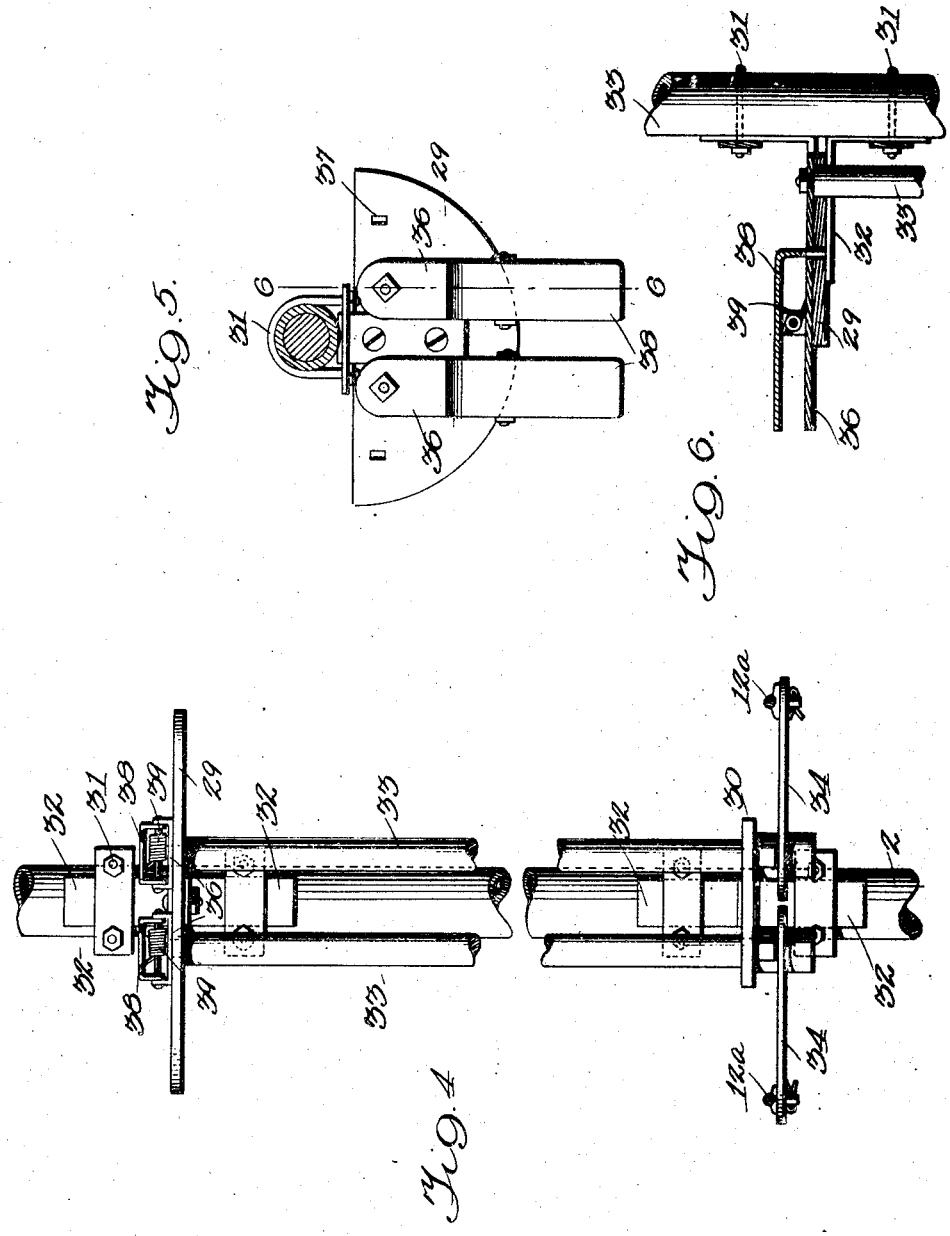

UNITED STATES PATENT OFFICE.

ALPHA HAROLD BARR, OF VENTURA, CALIFORNIA.

SIGNALING DEVICE.

1,356,185.  Specification of Letters Patent.  Patented Oct. 19, 1920.

Application filed January 3, 1920. Serial No. 349,135.

*To all whom it may concern:*

Be it known that I, ALPHA HAROLD BARR, a citizen of the United States, and a resident of Ventura, in the county of Ventura and State of California, have invented certain new and useful Improvements in Signaling Devices, of which the following is a specification.

My invention is an improvement in signaling devices, and has for its object to provide a device of the character specified especially adapted for use with motor vehicles, for indicating to following vehicles and to those in front, as, for instance, traffic officers and the like, the intentions of the driver as regards turning and stopping, wherein mechanism is provided at the front and rear of the car for indicating turns to the right and left or halts, under the control of the driver at the wheel.

In the drawings:

Figure 1 is a side view of a motor vehicle provided with the signaling device, with parts in section;

Fig. 2 is a front view of the signaling device at the front;

Fig. 3 is a similar view of the device at the rear;

Fig. 4 is a front view of the controlling mechanism mounted on the steering post;

Fig. 5 is a plan view of the said controlling mechanism;

Fig. 6 is a section on the line 6—6 of Fig. 5;

Fig. 7 is a perspective view of the bell cranks and their support;

Fig. 8 is a perspective view of one of the signal operating arms;

Fig. 9 is a similar view of one of the bell cranks.

The present embodiment of the invention is shown in connection with a motor vehicle 1 of usual type, and signaling mechanism is arranged at the front and at the rear of the vehicle. The mechanism at the front is supported by a frame consisting of a forward plate 2, which carries the signals, and a rear plate 3 which fits against the front of the radiator 4 and is secured thereto in any suitable or desired manner.

The signals or indicators are in the form of arrow shaped arms 5, which are secured to bolts 6 mounted to rotate in the plate 2 before mentioned, and the said arms 5 in normal position are vertical and parallel, having their headed ends upward, and they are arranged on each side of the center of the plate 2. Each bolt 6 has rigid therewith an operating arm 7, each arm having a hub 8 which embraces the bolt and is secured thereto by means of the set screw 9 threaded through the hub into engagement with the shaft, and links 10 connect the operating arm 7 with bell cranks 11. Each link 10 is connected to one arm of the bell crank and the other arm of each bell crank is connected by a link 12 with one arm of another bell crank 13 supported from the frame by means of a bracket 14. A bell crank 11 is provided for each signal, and it will be noticed that the links 10 converge toward the bell cranks, the bell cranks being spaced apart from each other and being mounted upon the ends of a rod 15 which is supported by a substantially U-shaped bracket 16 secured to the frame of the vehicle 1.

It will be noticed that the bell cranks 11 have hubs 17 which are held on the rods by nuts 18, the bell cranks being arranged at the outer sides of the arms 16 of the bracket. A bell crank 13 is provided for each signal arm, and the signal arms at the rear of the vehicle are also connected with these bell cranks 13, the corresponding signal arms at each side of the vehicle being connected to the same bell crank.

The rear signaling mechanism consists of signal arms 19, which are pivoted between arc shaped plates 20 and 21, the plates being held in spaced relation by arbor bolts 22, and the rear plate 21 has an extension 23 which is secured to the rear of the frame as shown. Each of these signal arms 19 is mounted on a bolt $6^a$ similar to the bolt 6 at the front, and each bolt $6^a$ has an operating arm $7^a$ adjustably secured thereto and corresponding to the arm 7 of the front signaling mechanism.

Coil springs 24 are arranged between the operating arm $7^a$ and a post 25 extending upwardly from the plate 20, and act normally to hold the signaling arms in the position of Fig. 3, that is, in inoperative position. Links $10^a$ connect the controlling arms $7^a$ with bell cranks $11^a$ similar to the bell cranks at the front of the vehicle and similarly arranged, the bell cranks being pivoted on a bolt $15^a$ which is journaled in a U-shaped bracket $16^a$ depending from the frame.

The links $10^a$ are connected to the uppermost arms of the bell cranks, and links 12ᵃ connect the other arms with the bell cranks 13 before mentioned, the links 12 and 12ᵃ at each side being connected to the same arm of the bell crank. Referring to Fig. 7, it will be seen that the U-shaped bracket 14 which supports the bell cranks 13 is secured to one of the arms of an angle plate 20, whose other arm is secured to the frame of the vehicle 1 by bolts and nuts 27. The bracket 14 is arranged below the steering post 28. A pair of segmental plates 29 and 30 is clamped onto the steering post by means of U-shaped clips 31, the bodies of the clips embracing the post and the arms engaging the angle plates 32. A pair of angle plates 32 is provided for each plate 29 and 30, the angle plates being arranged at opposite sides of the segmental plates and secured thereto in any suitable or desired manner, and these segmental plates provide bearings for shafts 33 which are journaled parallel with the steering post. Each of these shafts has a radial outwardly extending arm 34 at its lower end, and each of these arms is connected by a link 35 with the adjacent bell crank 13. At the upper end a controlling lever 36 is secured to each shaft 33, and the controlling arms move upon the segmental plates 29 before mentioned.

This plate 29 has four notches or recesses 37 which are adapted to be engaged by an angular lug on a latch lever 38 which is pivoted to the lever 36 and is normally pressed by a spring 39 toward the plate 29. Referring to Fig. 5, it will be seen that two of these notches are near the straight edge of the segmental plate, and that the other two are on each side of the radial line which bisects the plate. The last named openings are in such position that when the latches are in engagement with said openings the levers 36 will be substantially parallel, and all of the signals will be in inoperative position. The plate 29 is arranged just beneath the steering wheel so that the levers 36 are in convenient position for engagement by the driver to operate said levers. The bell crank levers 11 are supported by a bracket 40 at the front of the frame, and the bell cranks 11ᵃ are supported by a bracket 41 at the rear of the frame.

In operation, when the driver intends to turn to the right, for instance, he will release the lever 36 at the right and will swing said lever to the right. The shaft 33 will be rotated and the bell cranks 11, 11ᵃ and 13 will be swung, and the signal arms 5 and 19 at the right of the vehicle will be swung so that the arrow heads of the said arms will point to the right. If he intends to turn to the left he will operate the lever 36 at the left and if he intends to stop he will operate both levers, causing the signal arms of each device to point in opposite directions.

Referring to Fig. 1, it will be seen that each of the links 12 and 12ᵃ is adjustable in length, each link being sectional, and the sections being connected by a species of turnbuckle 42. As shown in Fig. 1, the support for the rear signaling device, as well as the support for the bell cranks 11ᵃ, is connected to a common device 43 for connection with the frame of the vehicle. The improved device may be connected to any vehicle merely by attaching the support 43 at the rear, the bracket 40 and the plate 3 at the front, the bracket 14 to the frame and the shafts 33 to the steering column. By means of the turnbuckles 42 the links 12 and 12ᵃ may be adjusted to the proper length. It will be understood that the signaling devices may be connected to any part of the vehicle, as, for instance, to the fenders, if desired.

I claim:

1. In a motor vehicle, means controllable from the steering wheel for indicating the intention of the driver as to turning or stopping, said means comprising a supporting bracket adapted for connection with the vehicle, a pair of bolts journaled in the bracket, a signal arm secured to each bolt, an operating arm rigid with each bolt, a post extending upwardly from the bracket between the arms, springs arranged between the operating arm and the posts and normally holding the signal arms vertically, and means connecting with the operating arms for moving the signal arms against the resistance of the spring, said means comprising a substantially U-shaped bracket supported by the support, a pair of elbow levers pivoted between the arms of the bracket, links connecting the operating arms with the elbow levers at one of the ends thereof, and controlling means for the elbow levers connected with the other ends thereof.

2. In a motor vehicle, means controllable from the steering wheel for indicating the intention of the driver as to turning or stopping, said means comprising a supporting bracket adapted for connection with the vehicle, a pair of bolts journaled in the bracket, a signal arm secured to each bolt, an operating arm rigid with each bolt, a post extending upwardly from the bracket between the arms, springs arranged between the operating arm and the posts and normally holding the signal arms vertically, and means connecting with the operating arms for moving the signal arms against the resistance of the spring.

ALPHA HAROLD BARR.